July 21, 1931.  A. T. J. BAHR  1,815,757
STARTING MACHINE
Filed Jan. 13, 1930   6 Sheets-Sheet 1
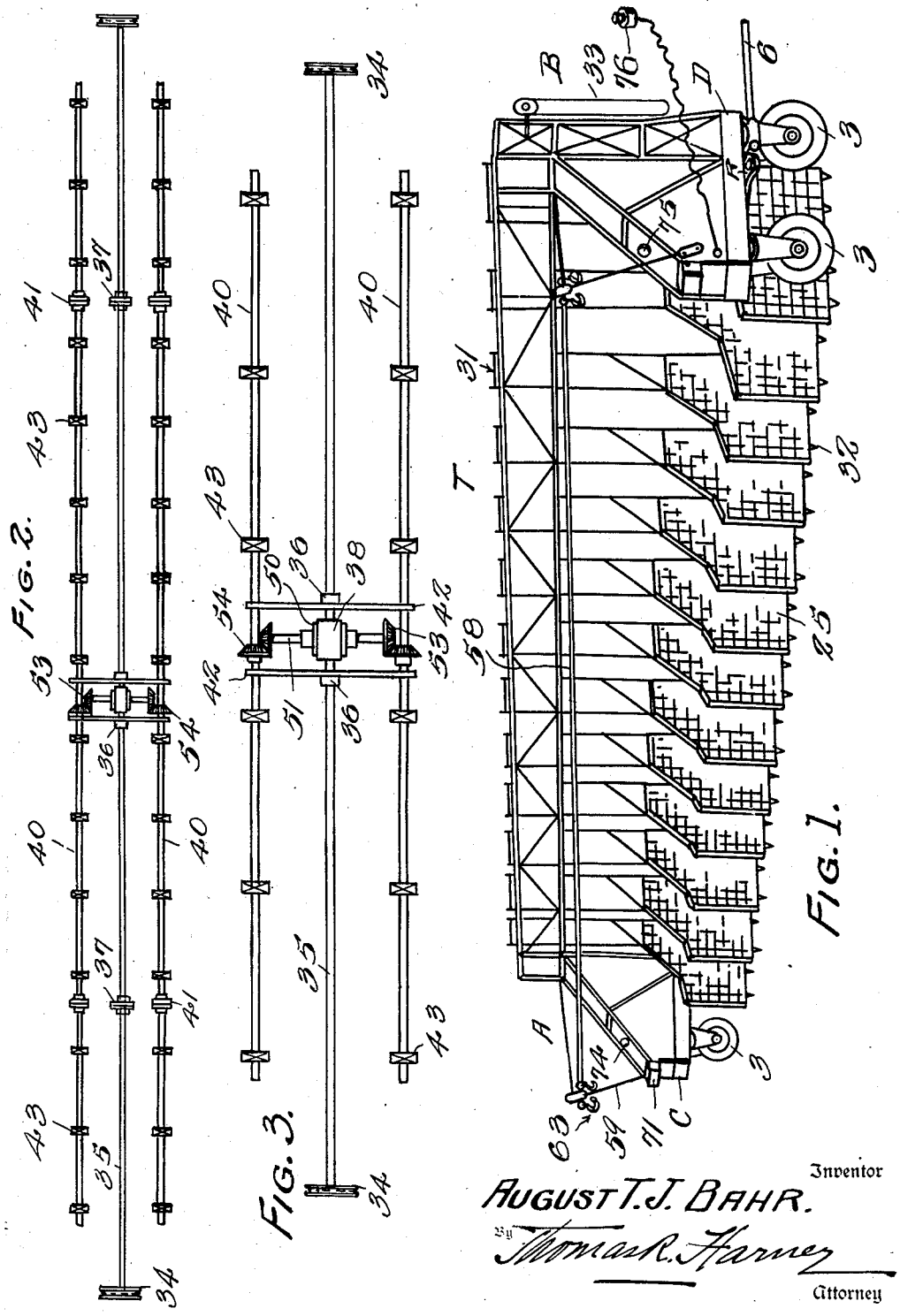

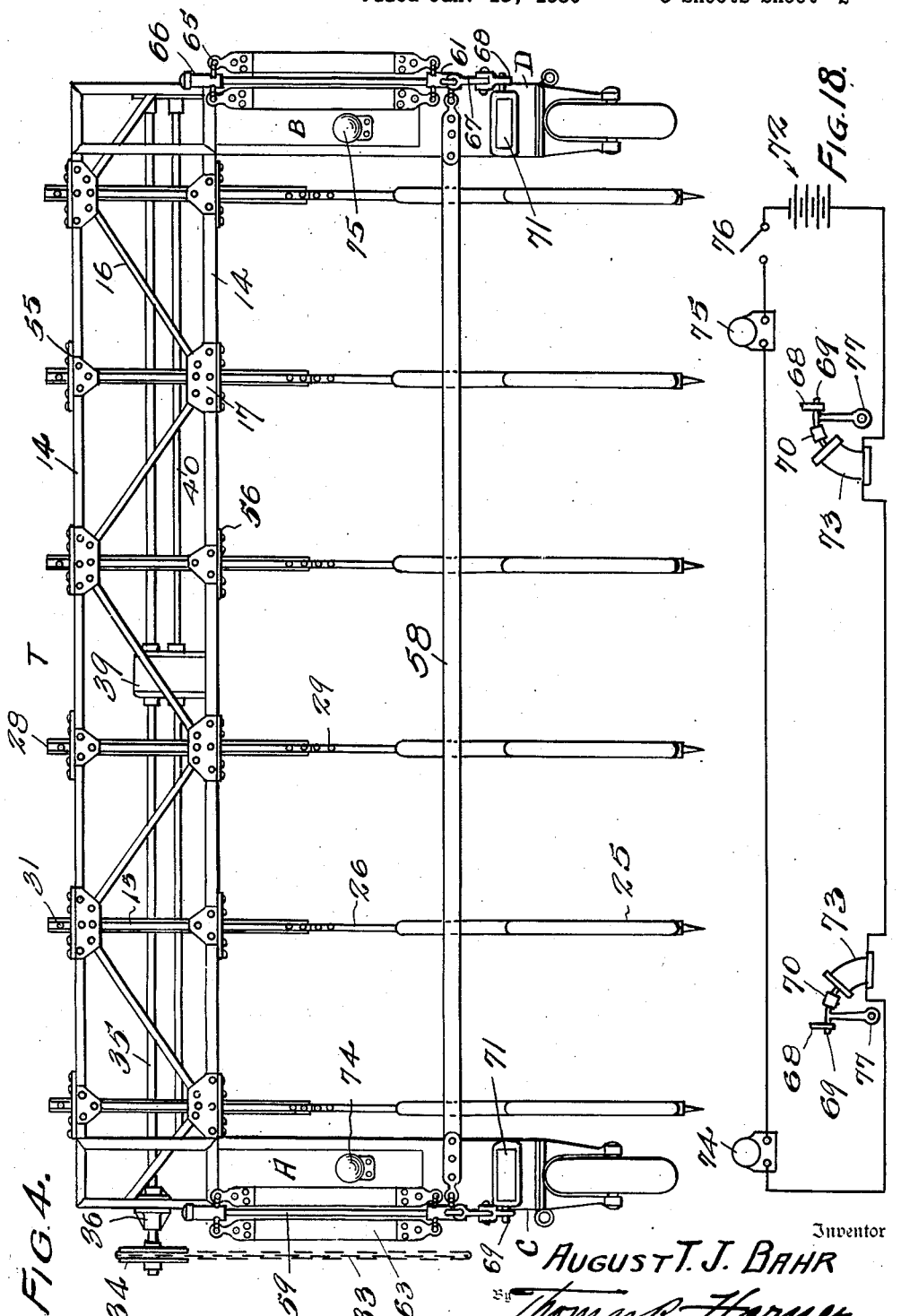

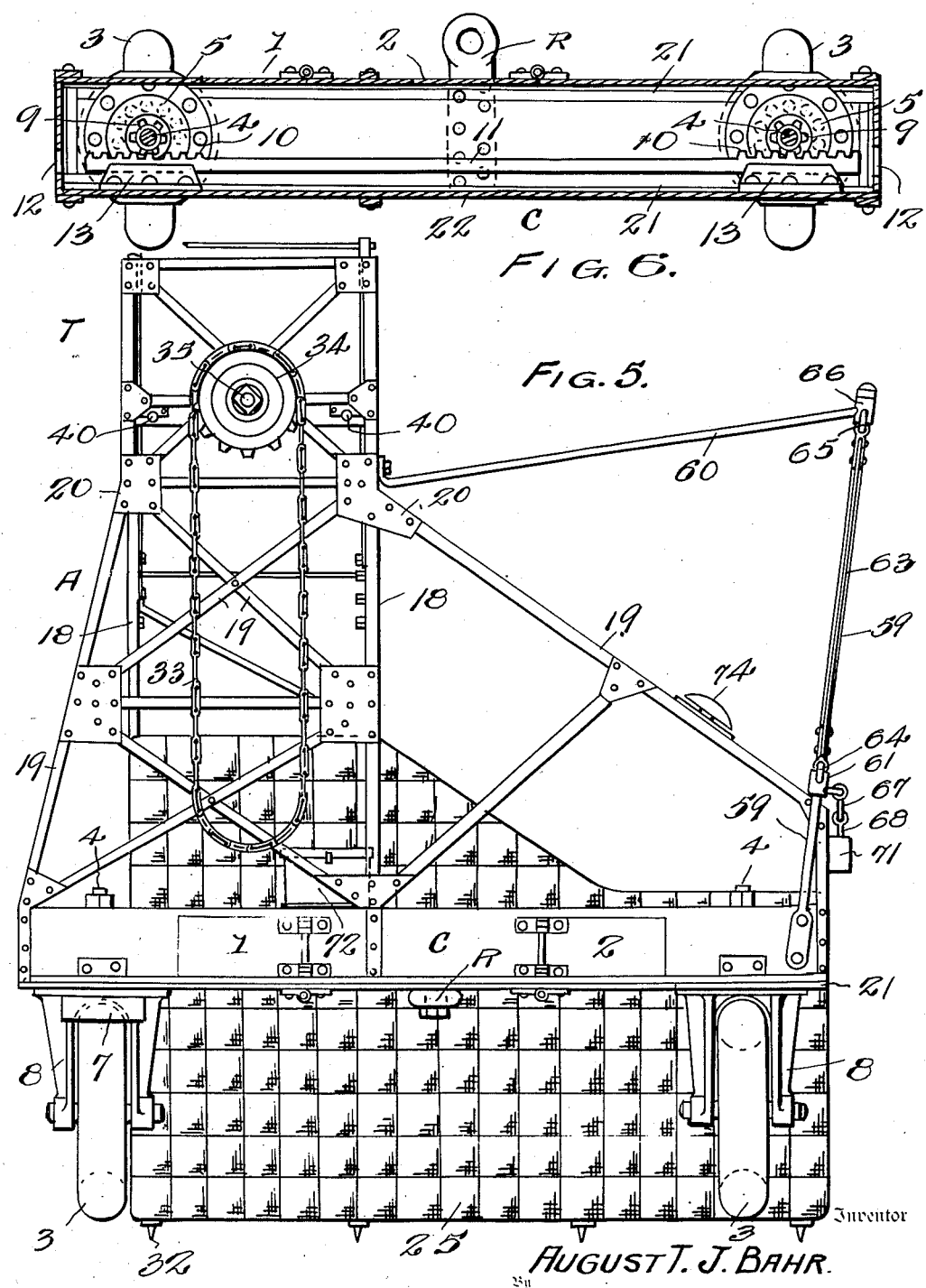

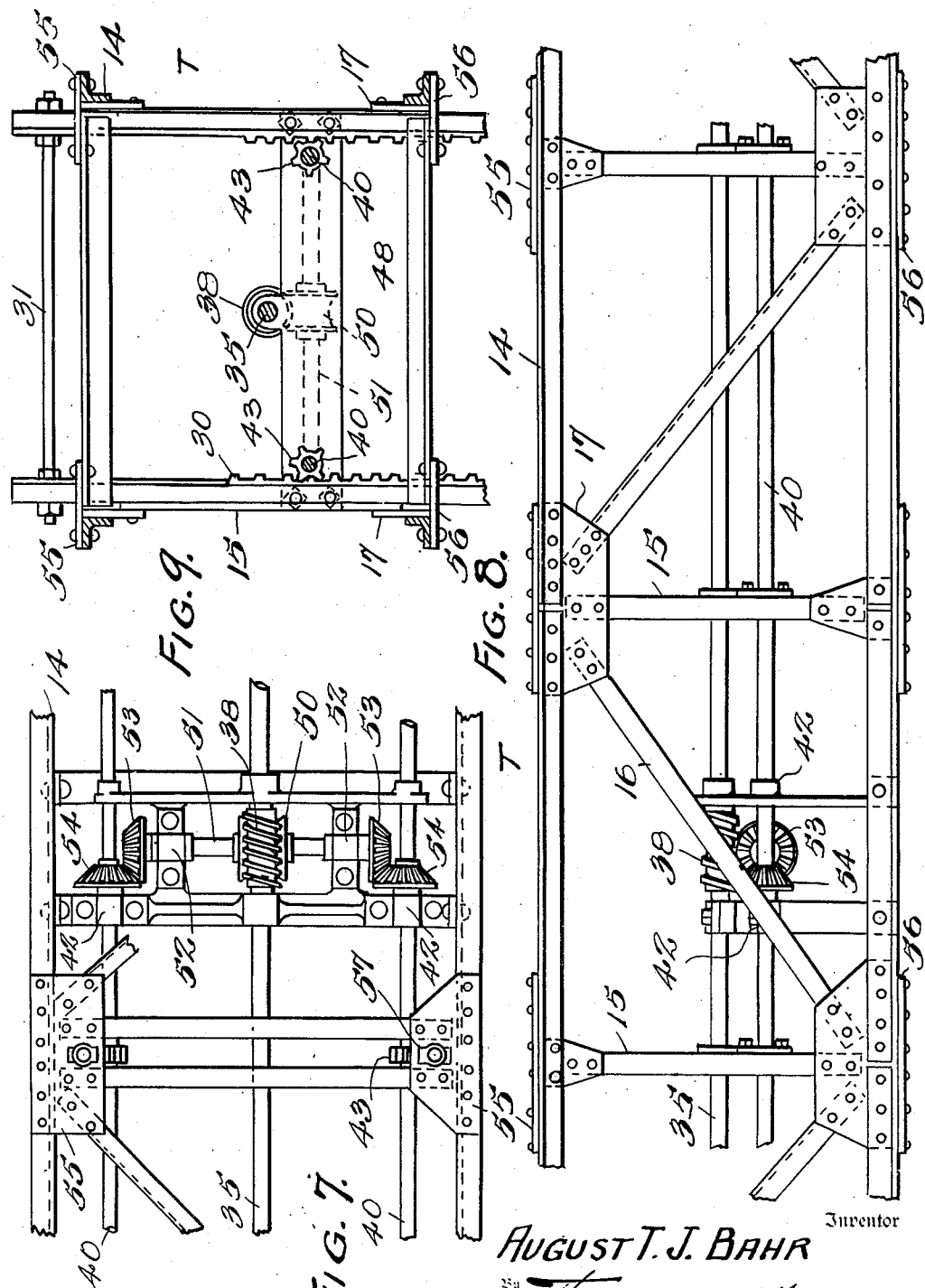

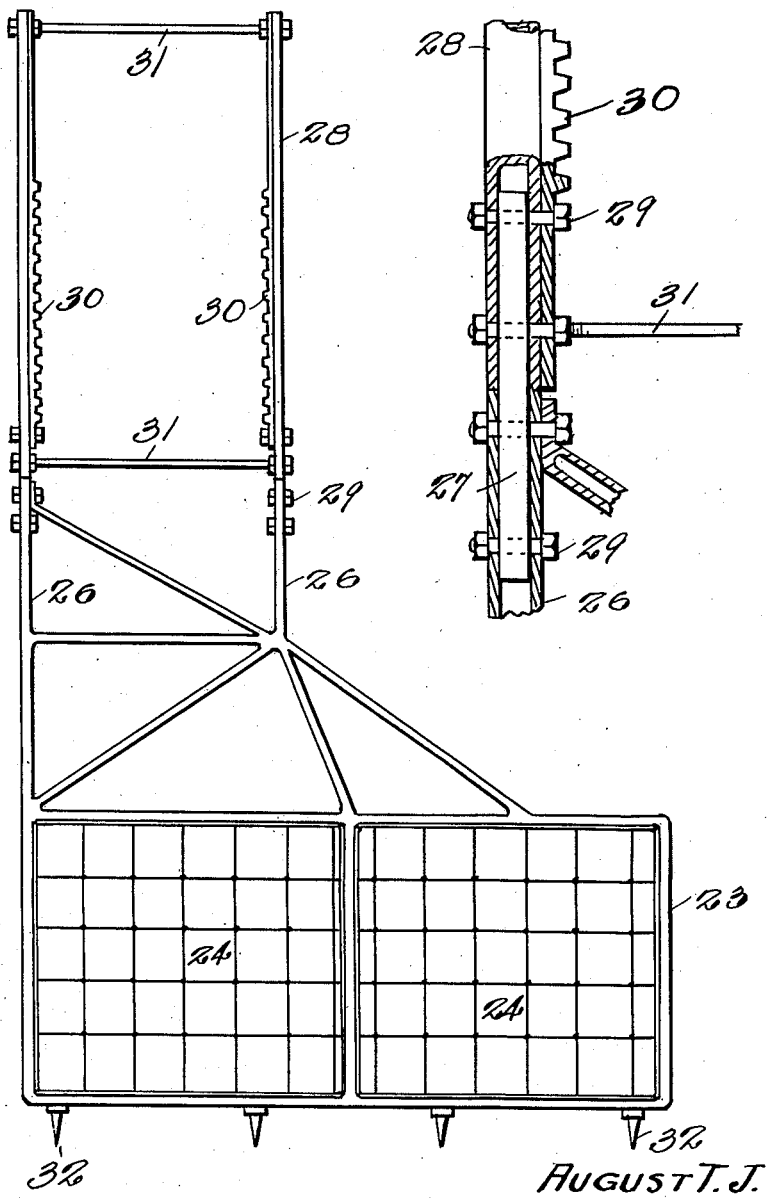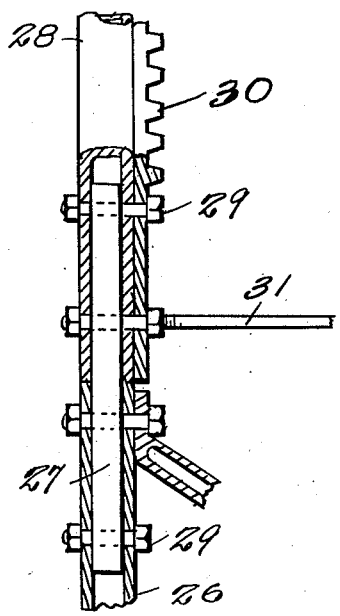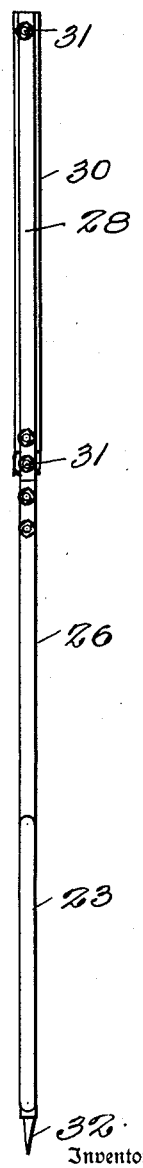

July 21, 1931.   A. T. J. BAHR   1,815,757
STARTING MACHINE
Filed Jan. 13, 1930   6 Sheets-Sheet 6

Patented July 21, 1931

1,815,757

UNITED STATES PATENT OFFICE

AUGUST T. J. BAHR, OF KANSAS CITY, MISSOURI, ASSIGNOR TO BAHR STARTING GATE CORPORATION, OF CHICAGO, ILLINOIS, A CORPORATION OF ILLINOIS

STARTING MACHINE

Application filed January 13, 1930. Serial No. 420,593.

The present invention relates to improvements in starting machines for use in training horses to start in races, as well as for starting horse races and other races of this nature.

The invention contemplates a portable, wheeled, vehicle or appliance, that may be drawn by the use of a tractor, or by horse power, to and from the starting position of a race track.

The appliance is manufactured in various sizes, the smaller ones for training horses, and the larger ones designed to accommodate various numbers of horses that may be entered in a race. For this purpose the stall partitions that form the stall structure, may be arranged in sections comprising predetermined numbers of stalls, and one or more stalls may be employed, or one or more sections of stalls may be employed, depending upon the number of horses to be trained or started.

Means are employed whereby the weight of the appliance may be shifted from the supporting wheels to the partitions of the stall-structure and borne by the latter structure in stationary, rigid, starting position, for confining the horses in their starting stalls, and for resisting lateral pressures from the horses after they have entered the stalls of the starting machine.

Means are utilized for elevating the stall partitions above the ground surface, when the machine is to be transported or rolled upon its wheels, and means are also provided whereby the partitions may relatively be adjusted in order that the stall partitions may conform to a track with a flat surface, or to a track with a convex surface, or with a concave surface.

Thus the stall partitions may be adjusted, vertically, so that their bottoms will rest upon the surface of the usual flat track, as well as upon the surface of "crowned" tracks.

A barrier, under control of the starter, is utilized as part of the equipment of the machine, to maintain the horses in alinement in their stalls, and electrically controlled means are employed for releasing the barrier to insure an even start for the race and a quick getaway of the starting horses.

After the start, if desired, the stall partitions may be elevated, and the appliance or machine may quickly be rolled from the track out of the way of the racing horses.

While I have shown the structure constructed principally of fabricated steel it will be understood that various materials may be used; sizes and shapes of parts may be varied; and other changes made, but the appliance remains simple in construction and operation, and can be operated to prevent a jockey from "beating the barrier", thus insuring a fair start for the race.

Figure 1 is a perspective view of the starting machine, with twelve stalls, and with the barrier raised, as after a start.

Figure 2 is a diagrammatic view of the driving and driven shafts of a machine accommodating fourteen horses, with the shafts shown in sections and bolted together.

Figure 3 is a diagrammatic view of the driving and driven shafts of a five stall machine.

Figure 4 is a front view of a starting machine used for training horses to start, and also for starting races, the barrier being shown in down position.

Figure 5 is an end view of the starting machine, with the barrier down.

Figure 6 is a horizontal sectional view through one of the hollow end bolsters, showing the transmission device for the steering mechanism.

Figure 7 is a top plan, detail view, of a portion of the overhead truss showing the power transmission gears between the driving and driven shafts that control the stall partitions.

Figure 8 is a front detail view of a portion of a truss that connects the two end towers of the machine, showing the details of construction, together with the shafts and transmission gears.

Figure 9 is a vertical, cross sectional view of the truss showing its details of construction, together with the rack wheels in engagement with the rack bars of the stall partitions.

Figure 10 is a side elevation of a stall partition, with the padding omitted for convenience of illustration.

Figure 11 is an enlarged detail sectional view showing the separable posts, or separable sections of posts, of the stall partitions.

Figure 12 is a front edge view of a stall partition.

Figure 13 is a front view, with the barrier down, of the machine, with its stalls adjusted for use on a race track with a crown, or convex surface.

Figure 14 is a detail face view showing one of the separable thrust lock-plates, for the driven or rack shafts, which lock plates permit movement of the rack shafts preliminary to relative, vertical adjustment of the stall partitions.

Figure 15 is a top plan view, near one end of the machine, showing the thrust bearings and plates for the rack shafts.

Figure 16 is a detail front view of one of the releasable locking devices for holding the barrier down.

Figure 17 is a detail side view showing one of the slide sleeves, and the lock hook on the slide bolt of one of the barrier locks.

Figure 18 is an electrical diagram showing the electromagnetic release device for the barrier lock, together with the two starting signals or bells that are energized when the barrier is released.

In carrying out the invention, an overhead truss is utilized, which extends transversely across the track at the starting point, and the truss is indicated as a whole by the letter T. The truss is supported at its ends on a pair of spaced towers A and B, and these towers, in turn, are supported above a pair of bolsters C and D, that are preferably hollow and covered, to form boxes. Suitable doors as 1 and 2 are hinged at the outer sides of these hollow bolsters to give access to the interior of the bolsters, and the latter may be used as tool-boxes, etc.

Each bolster has a pair of supporting and steering wheels, as 3, that are provided with rotatable king bolts 4, and provided with ball bearings 5 arranged in the bolsters. For turning the pairs of wheels for steering the appliance or machine, a handle bar 6 may be inserted in a sleeve 7 that is rigidly fastened to the inverted U-shaped yoke or wheel frame 8, to which the king bolt is secured.

Each king bolt is provided with a rack wheel 9 and these wheels engage the rack teeth 10 at the opposite ends of a horizontally disposed rack bar 11 in each of the bolsters. The rack bars extend longitudinally through the bolsters, and if necessary, holes 12 are provided in the ends of the bolsters to permit free movement of the rack bars. The rack bars are supported by and slide in the grooved guides 13 that are attached to the bolster wall, within the bolster, and a handle bar may be used to turn one wheel of a pair in order that the other wheel may also move in unison, through the connection between the rack bar and rack wheels.

The truss T is fabricated from angle iron bars 14, vertical spacing bars 15, and diagonal braces 16 that are riveted to tie plates 17 to form a rigid and strong overhead supporting structure for the stall partitions.

The two end towers are also constructed of angle-iron bars 18, braces 19, and tie plates 20, riveted together to form rigid and strong, but light, structures for supporting the overhead truss.

The two bolsters are fashioned of suitable iron or steel bars 21, bolted or riveted together, and preferably the bottoms, sides, and ends, as well as the tops of the bolsters are closed, by the use of metal plates as 22.

In Figure 1 the machine is designed to accommodate a maximum number of twelve horses; in Figure 4 the stalls are provided for a maximum of five horses; while in Figure 13, where the appliance is adjusted for use on a crowned or convex track surface, accommodations are provided for a maximum of fifteen horses starting in a race.

In all cases the stalls are fashioned by the use of a pair of adjoining partitions, spaced at suitable distances apart to accommodate the horses and jockeys.

As best seen in Figure 10 the stall partitions are fashioned with bottom frames 23 in which are fastened screens 24, and the padding or pads 25 are built upon the screens and bottom portion of the partition to protect the horses in their stalls, as well as the drivers or jockeys. Above the horizontally extending bottom frames of the stall-partitions are secured fixed post-sections 26, preferably of pipes or tubular bars, and in these sections are secured the lower ends of dowel pins 27. Removable post-sections 28 having socket ends, are secured on the upper ends of these dowel pins, and bolts 29 are used to secure the two post-sections to the dowel pins. Thus the stall partitions are provided with separable posts that permit ready assembling of the stall-partitions in the truss, and also permit facile removal of the partitions from the truss whenever desired.

The upper, removable post-sections of the partitions are each provided with rack bars 30, also secured by bolts to the upper post-sections, and cross bars or bolts 31 join the upper and lower ends of the removable sections to form a rigid upper structure for the stall partition.

On the bottom edges of the stall partitions are arranged a row of spaced spikes or stud bolts 32 that penetrate the surface of the race track when the weight of the appliance is shifted to the partitions, and hold the appliance or machine rigidly in starting position for the race. These partitions are vertically movable with relation to the supporting truss T, and they are also vertically movable or relatively adjustable one to another, the latter purpose being accomplished to adjust the row of stalls to the contour of the surface of the track, whether the surface be flat, concave, or convex.

The stall partitions are raised and lowered with relation to the truss in which they are suspended, by means of chains 33 and hand wheels 34 at opposite ends of the power or drive shaft 35 that is supported in bearings 36 in the truss, and which extends longitudinally through the truss with its ends projecting from the ends of the truss. As indicated in Figure 2 this shaft may be in sections and coupled together by couplings 37, and the shaft is provided with a worm screw 38 near the center of the truss, and enclosed within a gear case 39.

At the sides of the power shaft are disposed parallel rack shafts 40, which also may be in sections and coupled together at 41, these sectional shafts being used to adapt the machine to different lengths.

The rack shafts are journaled in bearings as 42 in the truss and they are provided with rack wheels 43 to engage the rack bars of the stall partitions. Thus it will be apparent that the partitions may be raised or lowered by manipulating the sprocket chains for the purposes heretofore described.

In order to disengage the rack wheels from the rack bars preparatory to adjusting the stall partitions with relation to one another, the rack shafts may be moved longitudinally. To permit this movement of the rack shafts they are each provided with a lock collar 44, and a lock plate 45 that is bolted at 46 and 47 to one of the cross bearing braces 48 of the truss. The lock plate has a notch 49 that fits over the shaft, and it will be apparent in Figure 14 that bolt 47 may be removed, bolt 46 loosened, and then the latter bolt may be used as a pivot to swing the plate out of engagement with the shaft. When the notched lock plate is thus displaced from both shafts, the shafts may be moved longitudinally the required distance to disengage the rack wheels from the rack bars. With the rack wheels and rack bars disengaged, the partitions may be adjusted as desired, after which the shafts are returned to their locked positions, and all partitions will be raised or lowered in unison, but with their upper and lower ends at relatively different levels.

When the sprocket wheels are turned to revolve the power shaft, power is transmitted from the worm screw 38 to a complementary worm wheel 50 at the center of a gear shaft 51 journaled in bearings 52 within the gear case. The opposite ends of the gear shaft are provided with bevel gears 53 that mesh with complementary bevel gears 54 on the rack shafts.

The vertical movement of the stall partitions is guided by means of guide plates 55 and 56 that are spaced apart and secured at the top and bottom portions of the truss. These plates have alined slots 57 through which the upper post-sections and their rack bars pass and are guided, and the slots are shaped to conform to the shape of the partition posts.

Across the front of the machine a barrier tape 58 is extended and supported so that it may be pulled down to starting position and restrain the horses until the starting time, and means are provided for releasing the barrier and elevating or raising it out of the way of the starting horses. For this purpose a barrier frame comprising a post or rod 59 is secured at the front portion of each bolster, and a diagonal brace 60 connects the upper end of each guide rod or post with the respective towers or with the opposite ends of the truss, to form rigid supports and guides for the barrier.

The barrier, which is fashioned of flexible material, is suspended at its ends to slide sleeves 61 on the posts 59, coupling eyes 62 being used for this purpose, and the slide sleeves guide the movement of the barrier as it is raised or lowered.

Each slide sleeve is provided with a pair of resilient and elastic straps, as 63, coupled at their lower ends by eyes 64 to the slide sleeve, and at their upper ends these straps, which may be of rubber, are coupled at 65 to a bushing 66 secured rigidly at the upper end of each post.

At the lower end of each slide sleeve is carried a loose link 67 upon which a releasable hook 68 is suspended, and this hook is adapted to engage a transversely arranged slide bolt 69 supported in a barrel or guide 70, and the other parts forming the retaining lock device for the hook are contained in a box as 71 on the front of the bolster, at each end of the machine.

In Figure 18 an electrical diagram is shown including a battery 72, two solenoid magnets 73, and two electric bells 74 and 75, together with a control switch 76. The bolts 69 form the armatures of the electro-magnets, and when the switch is closed the magnets are energized, and the armatures are swung on their pivot points 77 to withdraw the bolts 69 from the hooks 68, thus releasing the barrier. The switch 76 is under control of the starter of the race, and when the barrier is released, the stretched elastic straps immediately "snap" the barrier to the top of its frame out of the way of the starting horses and the bells ring as a starting signal.

In Figures 1, 5, and 6, a draw bar with a towing ring R is shown to which a tractor may be coupled, or horses may be hitched, for towing the machine from place to place.

Having thus fully described the invention what is claimed herein is:

1. In a portable starting machine, the combination of a vertically movable stall-structure including separable partitions, operating means for bodily moving the stall-structure relatively to the machine whereby the weight of the machine is borne by the partitions, and detachable means co-acting with the operating means for retaining the partitions against movement relatively to each other in the stall-structure, whereby when said detachable means are released from the operating means the separable partitions may be relatively adjusted in vertical planes to conform to the contour of the surface of a track.

2. In a portable starting machine, the combination of a pair of spaced towers and a truss rigidly connecting the towers, a vertically movable stall-structure including separable partitions, operating means for bodily moving the stall structure whereby the weight of the machine is borne by the partitions, and detachable means for retaining the separate partitions against movement relatively to each other in the stall-structure, whereby said partitions may be released for separate adjustment in vertical planes to conform to the contour of the surface of a track.

3. In a portable starting machine, the combination with a pair of spaced towers and a truss rigidly connecting the towers, of a vertically movable stall-structure including separable partitions, rack bars rigid with the partitions, gear shafts supported in the truss and gears on the shafts engaging the rack bars, detachable means for retaining the gears in engagement with the rack bars, and means for operating the gear shafts, whereby said partitions may be released for separate adjustment in vertical planes.

4. In a starting machine, the combination with a plurality of stall-partitions, of a plurality of longitudinally movable driven shafts and means on said shafts for moving the partitions in vertical planes, a drive shaft and transmission means between the drive shaft and the driven shafts, and means for locking the driven shafts against longitudinal movement.

5. In a starting machine, the combination with vertically movable stall-partitions, of a drive shaft, a pair of longitudinally movable driven shafts and transmission mechanism between the drive shaft and the driven shafts to operate the partitions, a collar fixed on each driven shaft, a notched removable lockplate engaging each collar, and means on the driven shafts for moving the partitions.

In testimony whereof I have affixed my signature.

AUGUST T. J. BAHR.